`US006015297A`

United States Patent [19]
Liberman

[11] Patent Number: 6,015,297
[45] Date of Patent: Jan. 18, 2000

[54] METHOD OF TEACHING AN EXAMINEE TO TAKE A MULTIPLE-CHOICE EXAMINATION

[76] Inventor: Michael Liberman, 2502 Tatnuck Ct., Herndon, Va. 20171

[21] Appl. No.: 09/048,303

[22] Filed: Mar. 26, 1998

[51] Int. Cl.[7] .................................................... G09B 3/00
[52] U.S. Cl. ............................................................ 434/322
[58] Field of Search .................................... 434/322, 353

[56] References Cited

U.S. PATENT DOCUMENTS

| | | | |
|---|---|---|---|
| 4,345,315 | 8/1982 | Cadotte et al. | 364/900 |
| 4,903,990 | 2/1990 | Crowdis . | |
| 5,522,732 | 6/1996 | Roberts et al. | 434/363 |
| 5,618,182 | 4/1997 | Thomas . | |
| 5,642,334 | 6/1997 | Liberman . | |

*Primary Examiner*—Robert A. Hafer
*Assistant Examiner*—John Edmund Rovnak

[57] ABSTRACT

A method of teaching a person how to detect, while taking an actual or practice multiple-choice examination, answers that are more likely, in comparison with other answers, to be incorrect, is disclosed. This method aids an examinee in choosing those answers that are most suspicious of being in error and which should therefore be rechecked before any other answers. This method gives the examinee an opportunity to correct the suspect answers and to improve his or her score to the maximum extent possible according to the level of his or her knowledge within the constraints of existing time limitations. Moreover, in the case of a practice test, this method assures that test preparation will be more focused on those areas of the tested subject where the person is weakest. Additionally, a method of teaching a person how to eliminate, while answering a question on an actual or practice multiple-choice examination, answer-choices that are more likely, in comparison with other possible alternative answer-choices, to be incorrect, is disclosed. The method enhances the ability of an examinee to receive partial credit for partial knowledge and to obtain scores commensurate with his or her knowledge of the tested subject while discouraging blind guessing. Moreover, an educational game helpful for practicing skills useful for taking a multiple-choice test is disclosed.

17 Claims, 3 Drawing Sheets

METHOD OF TEACHING AN EXAMINEE TO TAKE A MULTIPLE-CHOICE EXAMINATION

BACKGROUND OF THE INVENTION

1. Field of the Invention

The present invention relates to methods of teaching, particularly teaching a person how to detect potentially incorrect answers while taking multiple-choice examinations, and more specifically, how to detect, while taking a multiple-choice examination, answers that are more likely, in comparison with other possible answers, to be incorrect.

2. Description of the Related Art

Multiple-choice examinations are commonly used for testing in different areas of knowledge. Many review courses and study aids are available on the market. They train prospective examinees in the substantive areas of knowledge and also instruct examinees by teaching helpful exam-taking techniques suitable to the multiple-choice form of examination. Commonly such instructions include, no matter what substantive area is being tested, recommending that the examinee should (i) recheck as many of his test answers as time permits after he has answered all of the questions, (ii) narrow the number of possible alternative answer-choices by some intelligent process of elimination before answering any particular multiple-choice question, and (iii) select by guessing, whenever the examinee is unable to clearly determine the correct answer based on the substantive analysis of the problem, an answer-choice from those answer-choices not eliminated.

Such processes of elimination and subsequent guessing are considered to be necessary techniques to allow an examinee to take full advantage of his or her partial knowledge of the substantive subject matter of the test. It gives knowledgeable examinees an opportunity to narrow possible alternative answer-choices and thus to increase the probability of guessing correctly thereby getting an overall higher score in comparison with an examinee who has no knowledge of the subject matter, who is unable to eliminate at least some possible alternative answer-choices, and therefore has a worse chance of guessing correctly.

While these existing methods are very helpful to students and other examinees, they do not fully exploit a systematic approach that provides a simple, efficient and effective method that could be used during a multiple-choice examination or practice session.

BRIEF SUMMARY OF THE INVENTION

I. Nature and Substance of the Invention

A multiple-choice examination is a test comprising a number of questions to be answered by an examinee, in which each such question is accompanied by a group of distinctly labeled possible answers, each said distinct label being referred to as answer-choice, wherein the examinee answers each question by selecting one of the possible answer-choices from the group of possible answers associated with that question.

Commonly, multiple-choice examinations have a fixed number of possible answer-choices. That is, the number of distinctly labeled possible answers associated with each question in the examination is the same for every question in the examination. Moreover, the distinctly labeled groups of possible answers in multiple-choice examinations are usually uniformly labeled. That is, each distinctly labeled group of possible answers is labeled with the same set of labels or answer-choices.

The present invention is applicable to multiple-choice tests that have a fixed number of uniformly labeled possible answer-choices for each multiple-choice test question, and is useful in a number of different ways including (i) aiding in the detection of answers which are more likely to be incorrect as compared with other answers already selected, (ii) helping to eliminate potentially incorrect answer-choices from the groups of labeled possible answers, and (ii) locating possible answer-choices which may have a higher probability of being correct as compared with other possible answer-choices.

One use presents itself in the situation where the examinee has finished the entire exam, either actual or practice, but still has some time left that can be used to recheck his answers. Often, the time left for rechecking will not be sufficient for rechecking of all of the answers. Thus, the examinee will face the difficult problem of choosing which answers he should be rechecking. Of course, it will be more efficient for the examinee to recheck only those answers which are more likely to be incorrect in comparison with other answers already selected (in other words, the most "suspicious" answers). In this case, the time allotted to rechecking his answers will be used most efficiently and the examinee will be able to correct as many mistakes as possible thereby improving his score to the maximum extent possible.

In order to provide the examinee with an efficient methodology for pinpointing "suspicious" answers, the present invention utilizes information about the expected distribution of the answer-choices as well as the actual distribution of the answer-choices, and employs the notion of the over-represented and under-represented answer-choices.

For example, in a test in which the correct answer-choices obey a random or uniform distribution, each of the correct answer-choices would be expected to occur approximately the same number of times as any other correct answer-choice. Specifically, each answer-choice would be expected to occur a number of times approximately equal to that number which results from dividing a numerator by a denominator where the numerator is equal to the total number of the test questions and the denominator is equal to the number of possible answer-choices for each question. Thus, any answer-choice which occurred significantly more often than this expected number of times would be an over-represented answer-choice and the examinee may consider such answer-choices as more suspicious than any others.

Still another use occurs when an examinee is faced with a question in which he is unable to easily select the best answer-choice. In this case, any answer-choice which occurred significantly less often than the expected number of times would be an under-represented answer-choice and may be considered as more likely to be correct than any other answer-choices (presuming, of course, that the examinee's substantive knowledge is insufficient to provide any other clues).

This method is particularly helpful to those examinees who have better knowledge of the subject matter, and it discourages blind guessing. This is so, because the usefulness of the method depends on the number of questions the examinee can answer correctly. That is, the actual answer distribution is reliable as a basis for the comparison with the theoretical distribution only to the extent that the actual answers are correct. The more answers that are correct, the greater the reliability and thus the usefulness of the actual answer distribution. For this reason, the present invention encourages examinee to study hard, and benefits primarily those who are well prepared, who give mostly correct answers based on a substantive analysis and who resort to guessing in relatively rare cases.

II. Objects of the Invention

It is an object of the present invention to provide a person taking a multiple-choice examination or practicing in taking such examination, with an efficient method which allows him to pinpoint answers for subsequent substantive rechecking that are more likely, in comparison with other answers, to be incorrect. In this way, the examinee will be given an opportunity to improve his score to the maximum extent possible according to the level of his knowledge and within the constraints of existing time limitations.

Another object of the present invention is to provide a person taking a multiple-choice examination with an efficient method which allows, where the substantive analysis of a question does not provide the examinee with a definite answer, said person to pinpoint and eliminate those answer-choices, if any, that are more likely, in comparison with other available alternative answer-choices, to be incorrect, so that the odds of guessing correctly will be increased.

Still another object of the present invention is to create an incentive for an examinee to study hard without becoming overwhelmed, by allowing the examinee to utilize even partial knowledge of the test's subject matter in an effective manner.

And yet another object of the present invention is to create an educational game helpful for practicing skills useful for taking multiple-choice tests.

Additional objects and advantages of the invention are set forth in the drawings, description, and claims which follow. Some objects and advantages will be apparent from the applications and combinations particularly pointed out while other objects and advantages may be learned by the practice of the invention.

DETAILED DESCRIPTION OF THE INVENTION

Figure 1:
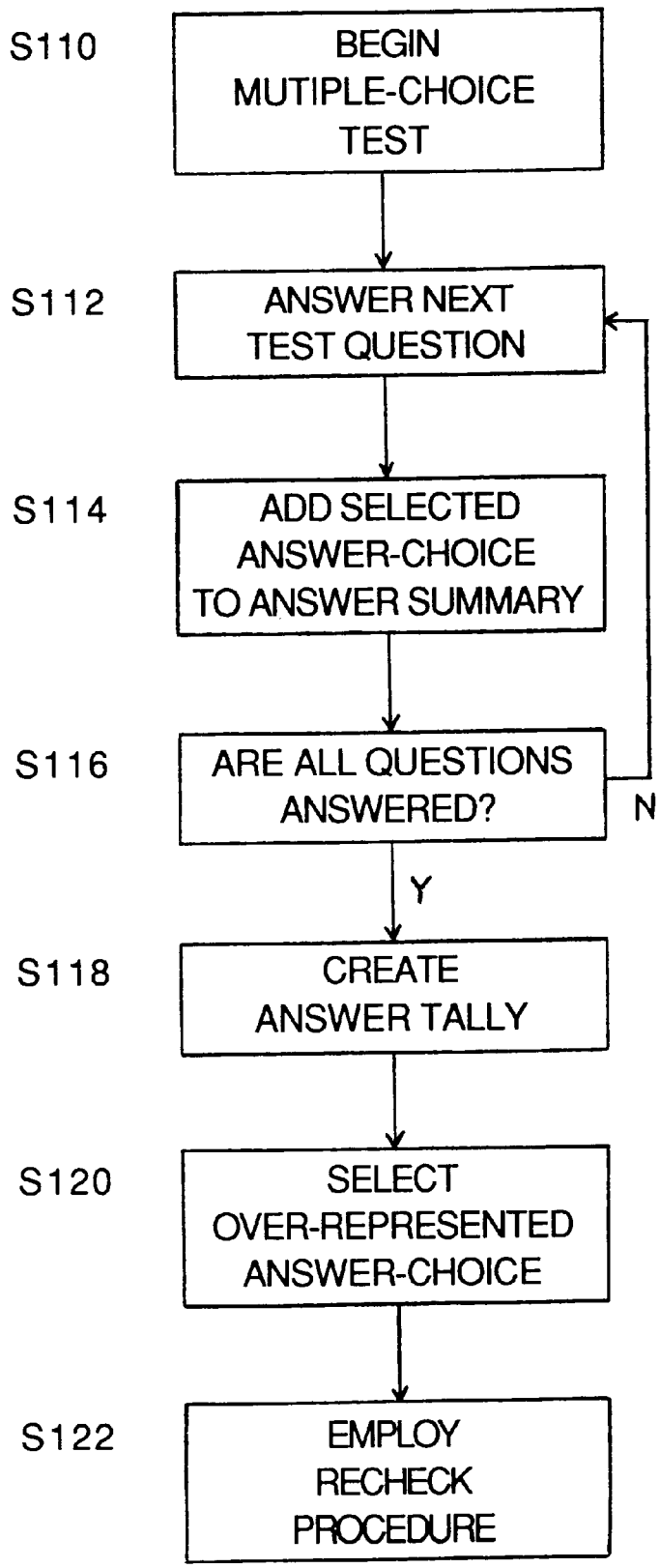
FIG. 1 is a flow chart of a test taking sequence that illustrates the steps of creating an answer summary and answer tally to be used in a recheck procedure.

A method of teaching a person an efficient methodology which enables him to detect incorrect answers while taking or practicing taking a multiple-choice examination is disclosed. The following description sets forth specific details only for purposes of explanation and to provide a complete understanding of the present invention. However, it is apparent to one skilled in the art that the present invention may be practiced by application of numerous modifications obvious to those skilled in the art without making use of the specific details shown and described, and that the present invention extends beyond embodiments described herein.

In accordance with one method of the present invention, the examinee, while answering the questions of an actual examination or while practicing by taking a practice test, is taught to keep track of his answers, via an answer summary, so that by the end of examination he has available the distribution of answer-choices he selected as most likely being correct, or in other words, the actual distribution of selected answer-choices. The examinee can then total up each of his answer-choices creating an answer tally of occurrence numbers for each answer-choice (i.e. the total number of times each particular answer-choice occurs in the actual distribution) whereby he can compare the theoretically expected distribution with the actual distribution and determine the most over-represented and under-represented answer-choices.

For example, if the total number of times a particular answer-choice, say the answer choice labeled with the letter "A", occurs in the actual distribution, is less often than it is expected to occur in the theoretical distribution (i.e. its occurrence number is less than expected), then the answer-choice "A" is said to be under-represented. By the same token, if it occurs in the actual distribution more often than it is expected to occur in the theoretical distribution (i.e. its occurrence number is greater than expected), then the answer-choice "A" is said to be to be over-represented. The most over-represented answer-choice is that answer-choice with the greatest number of occurrences in the actual distribution (i.e with the greatest occurrence number). The most under-represented answer-choice is that answer-choice with the least number of occurrences in the actual distribution (i.e with the smallest occurrence number).

Based on the actual distribution, the examinee can then assign the highest priority for rechecking to those "suspicious" answers, which, if changed, would increase the total number of under-represented answer-choices and decrease the number of over-represented answer-choices in the actual distribution to the greatest extent possible, thereby making the actual distribution as close to the theoretical one as possible. Finally, after these "suspicious" answers are determined, they are rechecked by the examinee who subjects them once again to the substantive analysis.

In other words, comparison of the actual and theoretical distributions serves as a tool for detecting answers, which are more likely, in comparison with other answers, to be incorrect. The extent to which the actual distribution may become closer to the theoretical distribution as a result of possibly changing a particular answer based on a subsequent substantive analysis serves as a criterium for the selection of particular answers as being the most "suspicious" ones.

In the same manner that a method of the present invention can be used to teach a person how to efficiently pinpoint answers that are more likely, in comparison with other answers, to be incorrect at an actual test, it can also be used to help an examinee who is taking a practice exam to prepare for a real test. Thus, even during practice sessions it can help to pinpoint "suspicious" answers to be rechecked before looking up the correct answers. Used this way, the method of this invention both saves time and automatically forces test preparation to be more focused on those areas where a prospective examinee is weakest.

In accordance with another method of present invention the examinee can, for each test question and after all other means of elimination (including substantive analysis) are exhausted, detect which of the remaining possible answer-choices are more likely to be correct and which are more likely to be incorrect. This is also accomplished by a comparison of the theoretical and actual answer-choice distributions. Based on such comparison the examinee can be taught, at any time during the test, how to determine which answer-choices, if any, are over-represented and, where possible, further eliminate the over-represented answer-choices, if such elimination is not outweighed by the substantive analysis of the question. Further, the examinee can, at any time during the test, determine which answer-choices, if any, are under-represented and, if guessing is necessary, consider selecting as an answer-choice one of the under-represented answer-choices. By comparing the actual answer-choice distribution with the theoretical distribution and choosing those answers which tend to minimize this discrepancy, the examinee will be further improving his intelligent guessing strategy.

In employing this method of the present invention, it is useful to include in the answer summary an alternate group of answer-choices, for each question for which an examinee has selected an answer-choice, wherein this alternate group comprises those of the remaining possible answer-choices which the examinee is not reasonably able to determine to be incorrect. In this way the examinee can quickly search for under-represented answer-choices within the various groups of alternate answers.

Naturally, as the examinee continues to answer test questions more data will become available for entry into the answer summary and hence the answer tally. As the answer tally's data base is increased, the actual answer-choice distribution should increasingly match the expected answer-choice distribution thereby increasing the efficiency of the method of this invention. For this reason, the examinee should generally wait until he has answered a majority of the test questions before beginning any recheck procedure or using these methods to guess answers.

It should be pointed out, that the efficacy of the method of this invention depends on the extent of the examinee's familiarity with the subject matter of the test. In particular, the present invention facilitates the process of elimination and intelligent guessing, and by doing that, enables the examinee to be rewarded with partial credit for partial knowledge, and thus to get a better score in comparison with an examinee with no knowledge of a subject.

Many aspects of the above discussion are illustrated in FIG. 1 which is a block diagram of the essential sequence of processing followed in one embodiment of the method of the present invention. This processing sequence begins at Step S110 wherein the examinee begins to take a multiple-choice test. The examinee proceeds one question at a time. The examinee continues to answer each question, as indicated by Step S112, by selecting the answer-choice that he thinks is most likely to be correct. After answering a question, the examinee proceeds to Step S114 wherein he adds his selected answer-choice for that question to an answer summary. In this way, an answer summary is created and is continually updated after each question is answered. Step S116 involves a decision fork which directs the examinee to repeat the process until all of the questions are answered at which time the examinee is directed to proceed with Step S118. In Step S118, the examinee totals up the number of times each answer-choice appears in the answer summary so as to create an answer tally. This answer tally then comprises an occurrence number for each answer-choice (i.e. the total number of times each particular answer-choice occurs in the actual distribution) whereby the examinee can compare the theoretically expected distribution with the actual distribution and select an over-represented answer-choice (i.e. an answer-choice with the largest occurrence number) as indicated by Step S120. Finally, the examinee can now employ the recheck procedure of Step S122, in which he rechecks those questions for which he has previously selected as an answer-choice the most over-represented answer-choice.

Figure 2:
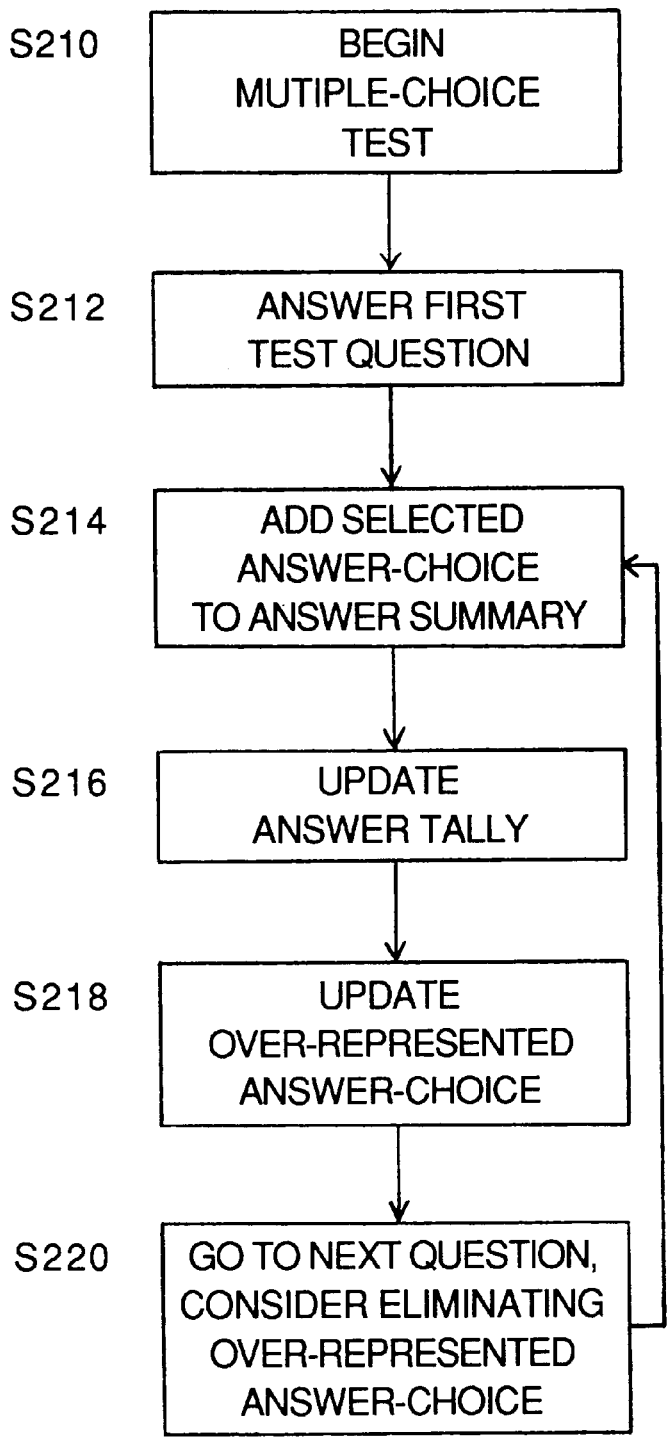
FIG. 2 is a flow chart of a test taking sequence that illustrates steps wherein an answer summary and answer tally kept on a running basis being updated after each question is answered.

Additional aspects of the present invention are illustrated by FIG. 2 which is a block diagram of the essential sequence of processing employing another embodiment of the method of the present invention. This processing sequence begins at Step S210 wherein the examinee begins to take a multiple-choice test. After the examinee answers the first question (Step S212) he updates an answer summary by including his selected answer-choice (Step S214). The examinee then proceeds to Step S216 wherein he increases the occurrence number corresponding to his selected answer-choice thereby updating an answer tally. In this way, both an answer summary and an answer tally are created and continually updated after each question is answered. In Step S218 we see that the most over-represented answer-choice is also updated after the answer summary and answer tally are updated.

Once these data bases are updated , the examinee proceeds to Step S220, in which he attempts to answer the next test question. In this step of the procedure, if the examinee has difficulty in selecting an answer-choice he should eliminate the most over-represented answer-choice and select his answer from the remaining answer-choices. The examinee then returns to Step S214 and repeats the process until he has finished answering all of the questions.

Figure 3:
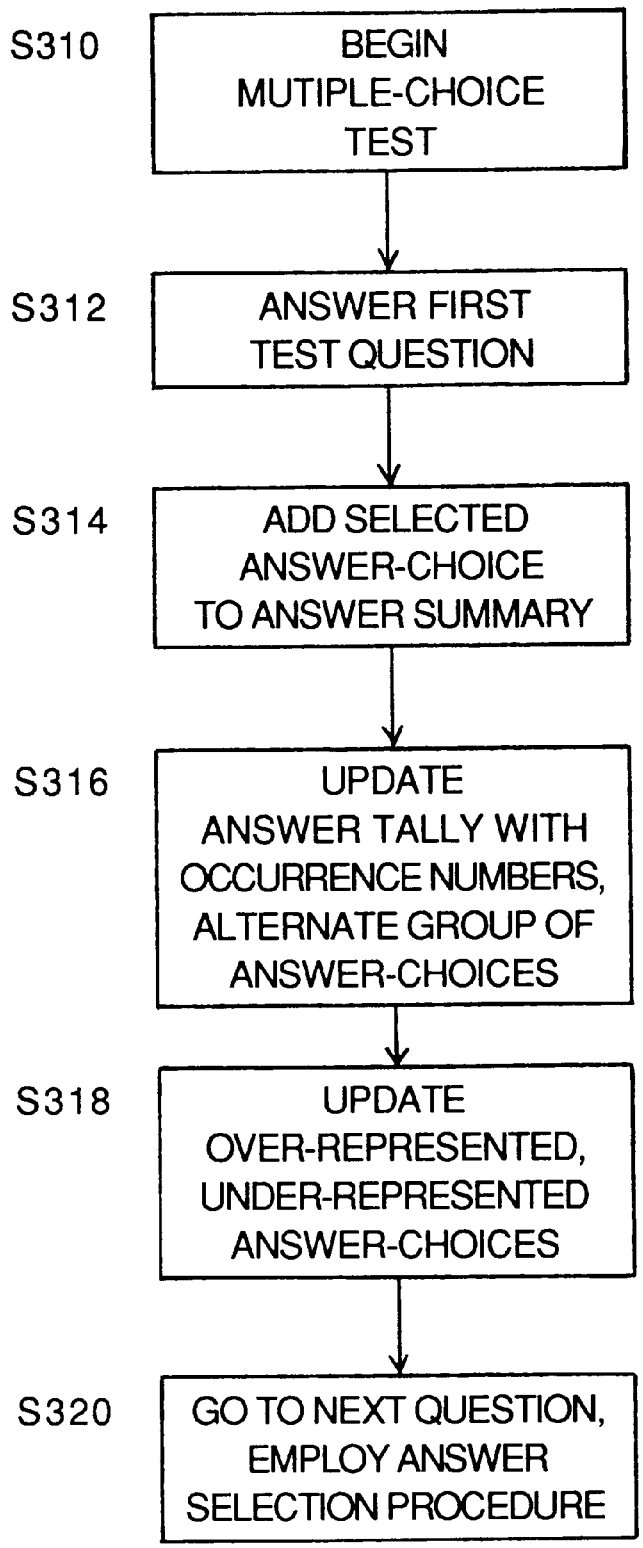
FIG. 3 is a flow chart of a test taking sequence that utilizes the concepts of both over-represented and under-represented answer-choices.

FIG. 3 is a block diagram of the essential sequence of processing employing yet another embodiment of the method of the present invention. Once again, in this example, the processing sequence begins at Step S310 wherein the examinee begins to take a multiple-choice test. After the examinee answers the first question (Step S312) he updates an answer summary by including his selected answer-choice in the answer summary (Step S314). The examinee then proceeds to Step S316 wherein he updates an amplified answer tally by (i) increasing the occurrence number corresponding to his selected answer-choice to that question, and by (ii) adding to the tally, for that question, an alternate group of answer-choices comprising those of the remaining possible answer-choices which said person was not reasonably able to determine to be incorrect in answering that question.

Additionally, the examinee (Step S318) updates his selection of the most over-represented and most under-represented answer-choice. In this way, both an answer summary and an answer tally are created and continually updated after each question is answered. In Step S320 the examinee proceeds to the next test question where once again tries to select the correct answer-choice. However, if he has difficulty in determining the correct answer, Step S320 provides for the examinee to employ an answer selection procedure. In this answer selection procedure the examinee will first eliminate as a possible answer-choice the most over-represented answer-choice. Then, if the examinee still has difficulty in determining the correct answer, he may consider selecting the most under-represented answer-choice as his best guess.

It should also be noted that, since the examinee has included in his answer tally an alternate group of answer-choices for each question, he may use this information to include a refined recheck procedure as part of this method. For example, when he is ready to recheck his answers, he may concentrate on rechecking only those questions in which his answer-choice is the most over-represented answer-choice and whose alternate group of answer-choices includes the most under-represented answer-choice.

We may further illustrate the procedures of the present invention by the following two specific examples.

EXAMPLE 1

This example illustrates how the concepts of over-represented and under-represented answer-choices can be applied in an actual test situation to help an examinee decide which questions he should give the highest priority in regards to rechecking his answers. In this example, we suppose that an examinee is taking a multiple-choice test in which the theoretical answer-choice distribution is random or uniform. Further, suppose that the test consists of 50 questions each having four different letter-choices ("A", "B", "C", and "D") as possible answers and that the examinee has already selected answer-choices for all 50 questions resulting in the following answer summary:

| | | | | |
|---|---|---|---|---|
| 1. B (A) | 11. A | 21. B | 31. C (D) | 41. D |
| 2. B | 12. B (A) | 22. A | 32. A | 42. B (D) |
| 3. A | 13. A | 23. A | 33. B | 43. D (A) |
| 4. A (B, D) | 14. A (B) | 24. B (C) | 34. B | 44. A |
| 5. C (A) | 15. C | 25. C | 35. D | 45. D |
| 6. C | 16. D (C) | 26. A (B) | 36. A (D) | 46. A (C, D) |
| 7. A | 17. A | 27. C | 37. B | 47. D |
| 8. A | 18. D | 28. D | 38. D | 48. B |
| 9. D (B) | 19. A | 29. C (B) | 39. D | 49. A |
| 10. B | 20. A (C) | 30. A (C) | 40. B | 50. A (B, C) |

This answer summary comprises, for each question for which the examinee has selected an answer-choice, (i) the selected answer-choice for that particular question and (ii) an alternate group of answer-choices comprising those of the remaining possible answer-choices which the examinee was not reasonably able to determine to be incorrect. In particular, the numbers refers to each of the 50 questions, the first letter following each number represents the examinee's answer-choice for that question, and whenever any letters appear in parentheses they represent an alternate group of probable answer-choices that the examinee was not reasonably able to determine to be incorrect. Based on this answer summary we can create the following answer tally: A: 20, B: 12, C: 7, D: 11.

This answer tally shows that the answer-choice WAN has occurred 20 times, the answer-choice "B" has occurred 12 times, etc. In this example, each answer-choice would be expected to occur approximately 12 or 13 times as the correct answer. Thus, it can be seen that the answer-choice "A" is the most over-represented. Therefore, those questions with the answer-choice "A" are more "suspect" than any other questions. Of these questions, those with probable alternative answer-choices shown in the parentheses should be examined in the first place. While examining such questions the most suspicious are those where the alternative answer-choice is "C", which is the most under-represented answer-choice. Therefore, the answers to questions 20, 30, 46, and 50 are the most "suspicious" and these questions should be selected for rechecking in the first place.

EXAMPLE 2

This example illustrates how the concepts of over-represented and under-represented answer-choices can be applied in an actual test situation to help an examinee select an answer-choice when he is not certain of the answer to a particular question. Here, we consider the same situation as in example 1, except that now we suppose that the examinee has only selected answer-choices for 45 of the 50 questions and has stopped at question 46 because he is not certain of the answer to that specific question. As in example 1, we suppose that during the test the examinee created an answer summary as follows:

| | | | | |
|---|---|---|---|---|
| 1. B | 11. A | 21. B | 31. C | 41. D |
| 2. B | 12. B | 22. A | 32. A | 42. B |
| 3. A | 13. A | 23. A | 33. B | 43. D |
| 4. A | 14. A | 24. B | 34. B | 44. A |
| 5. C | 15. C | 25. C | 35. D | 45. D |
| 6. C | 16. D | 26. A | 36. A | 46. |
| 7. A | 17. A | 27. C | 37. B | 47. |
| 8. A | 18. D | 28. D | 38. D | 48. |
| 9. D | 19. A | 29. C | 39. D | 49. |
| 10. B | 20. A | 30. A | 40. B | 50. |

Again, the numbers refer to each of the 50 questions and letter following each number represents the examinee's answer-choice for that question. In this case however, we are not keeping track of any alternate possible answer-choices. Nevertheless, just as in the above example, based on this answer summary we can create the following answer tally: A: 17, B: 11, C: 7, D: 10.

If, for the purposes of this example, we assume that the examinee has ruled out answer-choice "B" based on the substantive analysis of the question, he will be left with just three possible answer-choices "A", "C", and "D". If the examinee must now "guess" the correct answer, he can improve his chances of being correct by applying the concepts of over-represented and under-represented answer-choices. In this case, of the three remaining answer-choices "A" is the most over-represented and should be eliminated prior to guessing, leaving the examinee with just two answer-choices, "C" and "D". Moreover, if the examinee is still unable to select an answer-choice, he should consider choosing the answer-choice "C" because it is the most under-represented answer-choice.

Thus, according to the above described illustrations and examples, a method of teaching a person how to detect suspicious answers on a multiple-choice examination has been disclosed. These examples have shown how the present invention allows an examinee, at the stage of rechecking his answers, to pinpoint those answers that are most likely to be incorrect, and, therefore, to spend the time left for rechecking most effectively by concentrating on these suspicious answers. These examples have also shown that the method of the present invention aids an examinee in eliminating from consideration answer-choices that are more likely, in comparison with other available answer-choices, to be incorrect.

It should be realized that in the above description, precise relationships shown may be altered in varying degrees while achieving the essential objectives of the invention. Furthermore, since numerous modifications and changes will readily occur to those skilled in the art it is not desired to limit the invention to the exact realization and operation shown and described, and accordingly, all suitable modifications and equivalents are intended to be encompassed by the present invention, the scope of which is indicated by the appended claims.

What is claimed as being new and desired to be protected by letters patent of the united states is as follows:

1. A method of teaching a person to take a multiple-choice test in an efficient manner, where such multiple-choice test has the same fixed number of uniformly labeled possible answer-choices for each multiple-choice test question, said method comprising:

(a) teaching said person to keep an answer summary of all of the test questions for which said person has determined an answer by selecting an answer-choice, said answer summary comprising, for each question for which said person has selected an answer-choice, the selected answer-choice for that particular question;

(b) teaching said person to keep an answer tally,
said answer tally comprising an occurrence number for each of the possible answer-choices,
said occurrence number for each particular answer-choice being set equal to the number of times that that particular answer-choice occurs as a selected answer-choice in the answer summary;

(c) teaching said person to select as an over-represented answer-choice, an answer-choice that has an occurrence number equal to the occurrence number with the largest value in said answer tally; and (d) teaching said person to employ a recheck procedure, said recheck procedure comprising the step of reviewing at least one of those particular questions for which the selected answer-choice in said answer record happens to be the over-represented answer-choice.

2. The method of claim 1 wherein, (a) said answer tally is kept on a running basis by being updated each time
said person determines an answer to a test question by selecting an answer-choice; and (b) said over-represented answer-choice is updated on a running basis by being updated each time said answer tally is updated.

3. The method of claim 1 wherein, (a) the method further includes the step of teaching said person to select as an under-represented answer-choice, an answer-choice that has an occurrence number equal to the occurrence number with the smallest value in said answer tally;

(b) the answer summary further comprises, for each question for which said person has selected an answer-choice, an alternate group of answer-choices, said alternate group comprising those of the remaining possible answer-choices which said person was not reasonably able to determine to be incorrect; and (c) the recheck procedure further comprises the step of reviewing at least one of those particular questions in which both (i) the selected answer-choice in said answer record happens to be the over-represented answer-choice and (ii) the alternate group of possible answer-choices in said answer record happens to include the under-represented answer-choice.

4. The method of claim 1 wherein, said person is taught to employ the recheck procedure only after at least one occurrence number in the answer tally has a value which is greater in value than the number which results from dividing a numerator by a denominator where the numerator is equal to the number of the test questions for which said person has already determined an answer by selecting an answer-choice and the denominator is equal to said fixed number of possible answer-choices.

5. The method of claim 1 wherein, said person is taught to employ the recheck procedure only after said person has answered at least a majority of the test questions.

6. The method of claim 3 wherein, (a) said answer tally and said answer summary are both kept on a running basis by being updated each time said person determines an answer to a test question by selecting an answer-choice; and (b) said over-represented answer-choice and said said under-represented answer-choice are both updated on a running basis by being updated each time said answer tally is updated.

7. The method of claim 3, wherein the recheck procedure further comprises a score improvement procedure to be used for at least one of the questions being reviewed in accordance with the reviewing step of said recheck procedure, said score improvement procedure comprising the step of considering replacing a reviewed question's previously selected answer-choice with the under-represented answer-choice that is included in the alternate group of possible answer-choices for that question.

8. The method of claim 6, wherein the recheck procedure further comprises a score improvement procedure to be used for at least one of the questions being reviewed in accordance with the reviewing step of said recheck procedure, said score improvement procedure comprising the step of considering replacing a reviewed question's previously selected answer-choice with the under-represented answer-choice that is included in the alternate group of possible answer-choices for that question.

9. The method of claim 6 wherein, said person is taught to employ the recheck procedure only after at least one occurrence number in the answer tally has a value which is greater in value than the number which results from dividing a numerator by a denominator where the numerator is equal to the number of the test questions for which said person has already determined an answer by selecting an answer-choice and the denominator is equal to said fixed number of possible answer-choices.

10. The method of claim 6 wherein, said person is taught to employ the recheck procedure only after said person has answered at least a majority of the test questions.

11. A method of teaching a person to take a multiple-choice test in an efficient manner, where such multiple-choice test has the same fixed number of uniformly labeled possible answer-choices for each multiple-choice test question, said method comprising:

(a) teaching said person to keep an updated answer summary of all of the test questions for which said person has determined an answer by selecting an answer-choice,
said answer summary comprising, for each question for which said person has selected an answer-choice, the selected answer-choice for that particular question;

(b) teaching said person to keep a running answer tally, as each of the test questions is answered by said person,
said running answer tally comprising a running occurrence number for each of the possible answer-choices, said occurrence number for each particular answer-choice being updated whenever the answer summary is updated, by being reset to be equal to the number of times that that particular answer-choice occurs as a selected answer-choice in the updated answer summary;

(c) teaching said person to select an over-represented answer-choice, said over-represented answer-choice being updated whenever the running answer tally is updated, by being reset to be an answer-choice that has an occurrence number equal to the occurrence number with the largest value in said running answer tally; and (d) teaching said person to employ an answer selection procedure, at least one time when said person is having difficulty in selecting an answer-choice for a particular question,
said answer selection procedure comprising the step of said person considering disregarding the current over-represented answer-choice as a candidate to be the selected answer-choice for said particular question.

12. The method of claim 11 wherein,
  (a) the method further includes the step of teaching said person to select an under-represented answer-choice, said under-represented answer-choice being updated whenever the running answer tally is updated, by being reset to be an answer-choice that has an occurrence number equal to the occurrence number with the smallest value in said running answer tally; and
  (b) the answer selection procedure further comprises the step of said person considering choosing the current under-represented answer-choice as the selected answer-choice for said particular question.

13. The method of claim 11 wherein, said person is taught to employ the answer selection procedure only after at least one occurrence number in the answer tally has a value which is greater in value than the number which results from dividing a numerator by a denominator where the numerator is equal to the number of the test questions for which said person has already determined an answer by selecting an answer-choice and the denominator is equal to said fixed number of possible answer-choices.

14. The method of claim 11 wherein, said person is taught to employ the answer selection procedure only after said person has answered at least a majority of the test questions.

15. A method of teaching a person to take a multiple-choice test in an efficient manner, where such multiple-choice test has the same fixed number of uniformly labeled possible answer-choices for each multiple-choice test question, said method comprising:
  (a) teaching said person to keep an answer summary of all of the test questions for which said person has determined an answer by selecting an answer-choice,
    said answer summary comprising, for each question for which said person has selected an answer-choice, the selected answer-choice for that particular question,
    and further comprising, for each question for which said person has selected an answer-choice, an alternate group of answer-choices, said alternate group comprising those of the remaining possible answer-choices which said person was not reasonably able to determine to be incorrect;
  (b) teaching said person to keep an answer tally,
    said answer tally comprising an occurrence number for each of the possible answer-choices,
    said occurrence number for each particular answer-choice being set equal to the number of times that that particular answer-choice occurs as a selected answer-choice in the answer summary;
  (c) teaching said person to select as an under-represented answer-choice, an answer-choice that has an occurrence number equal to the occurrence number with the smallest value in said answer tally; and
  (d) teaching said person to employ a recheck procedure,
    said recheck procedure comprising the step of reviewing at least one of those particular questions in which the alternate group of possible answer-choices in said answer record happens to include the under-represented answer-choice.

16. The method of claim 15 wherein, said person is taught to employ the recheck procedure only after at least one occurrence number in the answer tally has a value which is greater in value than the number which results from dividing a numerator by a denominator where the numerator is equal to the number of the test questions for which said person has already determined an answer by selecting an answer-choice and the denominator is equal to said fixed number of possible answer-choices.

17. A method of teaching a person to take a multiple-choice test in an efficient manner, where such multiple-choice test has the same fixed number of uniformly labeled possible answer-choices for each multiple-choice question, comprising:
  (a) teaching said person to keep an answer summary of all of the test questions for which said person has determined an answer by selecting an answer-choice,
    said answer summary comprising, for each question for which said person has selected an answer-choice, the selected answer-choice for that particular question;
  (b) teaching said person to keep a running answer tally that is updated each time said person determines an answer to test question by selecting an answer-choice,
    said answer tally comprising an occurrence number for each of the possible answer-choices,
    said occurrence number for each particular answer-choice being set equal to the number of times that that particular answer-choice occurs as a selected answer-choice in the answer summary;
  (c) teaching said person to select, whenever possible, as an over-represented answer-choice, an answer-choice that has an occurrence number which is greater in value than the number which results from dividing a numerator by a denominator where the numerator is equal to the number of the test questions for which said person has already determined an answer by selecting an answer-choice and the denominator is equal to said fixed number of possible answer-choices; and
  (d) teaching said person to employ a recheck procedure after an over-represented answer-choice has been selected,
    said recheck procedure comprising the step of reviewing, after an over-represented answer-choice has been selected, at least one of those particular questions for which the selected answer-choice in said answer record happens to be the over-represented answer-choice.

* * * * *